2,730,465

ELECTRICAL ARC WELDING

Paul Christiaan van der Willigen, Eindhoven, Netherlands, assignor to Hartford National Bank and Trust Company, Hartford, Conn., as trustee No Drawing. Application November 7, 1951, Serial No. 255,331

In Netherlands July 25, 1944

Section 1, Public Law 690, August 8, 1946
Patent expires July 25, 1964

1 Claim. (Cl. 117—206)

This application is a division of my co-pending U. S. application Ser. No. 641,628, filed January 16, 1946, now abandoned.

It is known to provide certain contrivances at the end of coated welding electrodes for readily starting the welding arc. Thus, for example, it was suggested before to provide the bare ground end of the welding electrode with a small conductive hood which constitutes a short-circuit bridge. In addition, a welding electrode has been described whose core for this purpose ends in a coated tip. Such welding electrodes with which rapping of the piece of work for starting the arc can be omitted, may be designated as self-starting welding electrodes. A disadvantage of these well-known welding electrodes consists in that on interruption of the welding operation or on extinction of the arc, which is liable to occur when using certain coating ingredients or a low no-load voltage of the welding apparatus, the welding arc cannot be re-started without additional means it being again necessary to resort to the normal arc-starting manner. This is particularly inconvenient in the use of touch-welding electrodes.

The invention has for one of its objects to avoid the difficulties involved by the use of the above-mentioned well-known self-starting welding rods or electrodes in touch-welding; as is well-known the coating of the welding electrodes is kept in continuous contact with the piece of work in this method.

The invention is based on recognition of the fact that this can be ensured by rendering the coating throughout its length electrically conductive to a certain extent. In addition, the coating should be enabled by its thickness to constitute such a deep cup that short-circuit of the core of the welding rod with the piece of work is avoided.

It is a further object of the invention to provide the core of a welding electrode with such a coating that in touchwelding the arc is started and restarted by contact of the coating at the welding end of the electrode with the workpiece.

On an electrode of the type which has a coating containing a large proportion of metal powder an arc is started when an electrical current of substantial magnitude passes through the coating.

Thus an electrode is only selfstarting if the coating thereon is conductive. It has been found that this conductivity requirement of the coating is met, if sparking occurs distinctly, when at an applied voltage which is equal to the no-load voltage to be used in the welding apparatus, the coating of the welding electrode is brushed in the direction of its length along an edge of a conductive body included with it in a circuit. An ammeter connected in this case into the circuit registers a constantly fluctuating deflection. The mean value of the current passing through the coating may be estimated during this observation. At a voltage of about 50 volts, for example, this current, expressed in milliamperes, is found to have a value of at least the order of magnitude of $10^2$. The greater the conductivity of the welding electrode coating, the more readily the welding arc will start.

It has also been found, however, that a touchwelding electrode with a conductive coating, for example a coating containing a large percentage of metal powder is likely to show an uneven burning and freezing onto the workpiece.

Uneven burning is here understood to mean the formation of a crater of irregular shape because the coating is not evenly consumed by the welding arc. In touchwelding with an electrode having a highly conductive coating the latter often is faster consumed where it is in contact with the workpiece than in any other point of the rim of the crater. This results in a shortening of the distance of the core end of the electrode to the workpiece and thus in shortening the arc length until the arc is short-circuited by molten metal. Then the arc extinguishes and the metal solidifies thereby securing the welding electrode on the workpiece which phenomenon is here designated as "freezing." It has been found that these phenomena result from a comparatively high electric current which traverses the coating during welding and that touchwelding can only be performed without occurrence of these phenomena if the coating acts as an insulator.

A further accurate study of these phenomena showed however that an electric current of low magnitude does not necessarily bring about the disadvantages in touchwelding described above and also that this current is sometimes sufficient to allow the arc to be ignited by simply contacting the workpiece with the coated welding end of the electrode.

The welding electrode according to the present invention is characterized in that at normal no-load voltage, the coating of which contains metal powder, passes a current capable of initiating the welding arc on contact of the coating with the workpiece but which current is so low that it is not capable of bringing about the phenomena of uneven burning and freezing.

In view of the easy re-starting of the welding arc, the invention is particularly important when using a coating which for metallurgic reasons contains substances having the disagreeable property of assisting extinction of the arc. Such is the case for example when using on a base coatings of fluoride and alkaline earth carbonate with core wire substantially constituted by iron. This ensures welds having very satisfactory mechanical properties, more particularly having a high impact value.

As an example of a welding electrode composed according to the invention I covered a mild steel core having a diameter of 4 mm. by extrusion with a mixture composed of 16% of calcium fluoride
16% of calcium carbonate
6% of ferro-titanium+ferro-silicon+ferro-manganese
54% of pulverulent iron
8% of water glass and aluminum silicate up to a diameter of 8.5 mm.

In addition the invention is particularly important in connection with welding by means of welding electrodes having a core of larger diameter than usual, that is to say, having a core of over 6 mm., for example 10 mm. Welding by means of heavy welding electrodes of this kind generally involves serious difficulty, such as fatigue of the welder by the large weight of the welding electrode, intense thermal radiation due to the high welding current and troublesome spraying of the welding metal. In touchwelding according to the invention this difficulty is largely obviated, since both during starting of the arc and during the subsequent welding the electrode rests on the piece of work so that the weight is not a source of trouble, and in addition the thermal radiation and the spraying are limited by the deep cup constituted by the coating during welding.

Furthermore the welding electrode according to the invention is characterized in that it is at least twice as thick as the metal core so as to enable the electrode to be used in touchwelding.

To satisfy the conductivity requirements mentioned above the metal content of the coating should have a value of between 50 and 65% by weight. It has been found that the short range of metal contents of the coating which brings about the conductivity requirements of a welding electrode according to the invention generally falls within this range of from 50 to 65% of the weight of the coating and that whether this range is near the lower or near the higher value or covers intermediate values depends on characteristics of the coating such as the proportion and nature of the other coating ingredients.

The invention thus comprises a welding electrode being composed of a core and a coating, the thickness of the electrode being at least twice the thickness of the core and the coating containing metal powder within the range of from 50 to 65% by weight, so that upon normal no-load voltage the coating passes a current capable of initiating the welding arc on contact of the coating with the workpiece but which current is so low that it is not capable of bringing about the phenomena of uneven burning and freezing in touchwelding. Welding electrodes which have a coating comprising metal powder have been described but the welding electrodes according to the invention are differentiated therefrom because they have an unusual thick coating and because they have to comply with the conductivity requirement of the coatings specified above.

Similar to normal welding electrodes the welding electrodes according to the invention may be coated simply by extrusion so that their manufacture is easier than that of the well-known, above-mentioned self-starting welding electrodes at whose welding end special initiating devices are provided.

According to the invention, a satisfactory weld may be secured without any trouble for example by means of a welding electrode whose core of mild steel has a diameter of 10 mms. and which is coated up to a thickness of 22 mms. with material containing a large quantity of the welding metal in a divided form. This material may be made up for example of:

12% of calcium fluoride
13% of calcium carbonate
7% of ferrous alloys
61% of pulverulent iron
7% of water glass and aluminum silicate.

According to the invention, such a welding electrode allows of welding with a current of about 1200 amp. without any need of taking particular precautions for protecting the welder. In contradistinction to this, welding by means of a welding electrode of identical total composition having all of the welding metal contained in the core is no longer feasible at an identical welding current.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claim.

What I claim is:

A welding electrode comprising a metal core having a diameter of 10 mms., a slag-forming conductive coating for said electrode comprising a mixture of 12% of calcium fluoride, 13% of calcium carbonate, 7% of ferrous alloys, 61% of pulverulent iron, and 7% of water glass and aluminum silicate, the thickness of the electrode being at least twice the diameter of the core whereby at no-load voltage of the welding apparatus the coating passes a current capable of initiating a welding arc on contact of the coating with a work piece.

References Cited in the file of this patent

UNITED STATES PATENTS

| | | |
|---|---|---|
| 1,294,250 | Elliott | Feb. 11, 1919 |
| 1,329,530 | Kinhead | Feb. 3, 1920 |
| 1,898,908 | Southgate | Feb. 21, 1933 |
| 2,009,240 | Roberts et al. | July 23, 1935 |
| 2,146,600 | Somerville | Feb. 7, 1939 |
| 2,394,550 | Jensen | Feb. 12, 1946 |
| 2,408,620 | Friedlander | Oct. 1, 1946 |
| 2,429,175 | Willigen | Oct. 14, 1947 |

FOREIGN PATENTS

| | | |
|---|---|---|
| 553,371 | Great Britain | May 19, 1943 |